(12) United States Patent
Lee et al.

(10) Patent No.: US 7,218,601 B2
(45) Date of Patent: May 15, 2007

(54) HIGH-DENSITY REPRODUCTION-ONLY OPTICAL DISC AND METHOD FOR REPRODUCING DATA FROM THE SAME

(75) Inventors: Kyung-geun Lee, Gyeonggi-do (KR); In-sik Park, Gyeonggi-do (KR); Myong-do Ro, Gyeonggi-do (KR); Du-seop Yoon, Gyeonggi-do (KR); Chang-min Park, Gyeonggi-do (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 690 days.

(21) Appl. No.: 10/461,426

(22) Filed: Jun. 16, 2003

(65) Prior Publication Data
US 2004/0001423 A1   Jan. 1, 2004

(30) Foreign Application Priority Data
Jun. 28, 2002   (KR) ................ 10-2002-0036854

(51) Int. Cl.
*G11B 5/09* (2006.01)
(52) U.S. Cl. ................ 369/275.3; 369/53.2; 369/53.31
(58) Field of Classification Search ............... None
See application file for complete search history.

(56) References Cited
U.S. PATENT DOCUMENTS
6,335,916 B1   1/2002   Endo et al.
6,914,856 B2 *  7/2005   Kim et al. ............. 369/44.26
2001/0033543 A1  10/2001  Akiyama et al.
2002/0015379 A1 *  2/2002  Yamaguchi et al. ..... 369/275.3
2002/0031079 A1 *  3/2002  Kato .................. 369/275.3
2002/0196729 A1 * 12/2002  Fairman et al. ........ 369/275.4

FOREIGN PATENT DOCUMENTS
KR   2001-72164   7/2001
KR   2003-12731   2/2003

OTHER PUBLICATIONS
Office Action issued in Chinese Patent Application No. 03815333.5 on May 19, 2006.

* cited by examiner

*Primary Examiner*—Muhammad Edun
(74) *Attorney, Agent, or Firm*—Stein, McEwen & Bui, LLP (57) ABSTRACT

A high-density reproduction-only optical disc includes a high frequency data zone in which disc related information is recorded by high frequency wobbles, a user data area in which user data is recorded by pits, and a transition zone which is formed between the high frequency data zone and the user data. Accordingly, the reliability of reproducing data from the user data area is improved.

37 Claims, 6 Drawing Sheets

HIGH-DENSITY REPRODUCTION-ONLY OPTICAL DISC AND METHOD FOR REPRODUCING DATA FROM THE SAME

CROSS-REFERENCE TO RELATED APPLICATIONS

This application claims the benefit of Korean Application No. 2002-36854, filed Jun. 28, 2002, in the Korean Intellectual Property Office, the disclosure of which is incorporated herein by reference.

BACKGROUND OF THE INVENTION

1. Field of the Invention

The present invention relates to a high-density reproduction-only optical disc having a transition zone between a zone in which disc related information is recorded as high frequency groove wobbles and a zone in which user data is recorded by pits, and a method of reproducing data from the same.

2. Description of the Related Art

Generally, optical discs are information recording media used in optical pickup devices which record/reproduce information in a non-contact manner. Optical discs are classified as compact discs (CDs) or digital versatile discs (DVDS) according to their storage capacity. Examples of types of optical discs capable of recording, erasing, and reproducing information include a 650 MB CD recordable (CD-R), a CD-rewritable (CD-RW), a 4.7 GB DVD+RW, a DVD-random access memory (DVD-RAM), and a DVD-RW. 650 MB CD and 4.7 GB DVD-ROM are examples of reproduction-only discs. Furthermore, high-density optical discs, for example, HD-DVDs having a recording capacity of 20 GB or more, have been developed.

In general, disc related information, that is, reproduction-only data is recorded in a lead-in area positioned at an inner portion of a conventional reproduction-only optical disc in the form of pits. However, in order to design a reproduction-only optical disc that is compatible with the same disc drives as a high-density recordable optical disc known or to be developed later, the formats of both discs must be consistent. Thus, a physical data structure of the high-density reproduction-only optical disc is required to be designed in consideration of the format of the high-density recordable optical disc.

SUMMARY OF THE INVENTION

Accordingly, it is an aspect of the present invention to provide a high-density reproduction-only optical disc having a high frequency data zone in which reproduction-only data is recorded by high frequency groove wobbles, an user data area in which user data is recorded by pits, and a transition zone provided between the high frequency data zone and the user data area, a disc format thereof being consistent with a format of a high-density recordable optical disc, and a method of reproducing data from the same.

Additional aspects and/or advantages of the invention will be set forth in part in the description which follows and, in part, will be obvious from the description, or may be learned by practice of the invention.

To achieve the above and/or other aspects of the present invention, there is provided a high-density reproduction-only optical disc comprising a high frequency data zone in which disc related information is recorded by high frequency wobbles, a user data area in which user data is recorded by data pits, and a transition zone which is formed between the high frequency data zone and the user data area.

The transition zone may include rows of pits in which pits may have the same size or different sizes.

One or more rows of pits may be wobbled. An amplitude of the wobbled rows of pits may be gradually reduced toward the user data area from the high frequency data zone.

The transition zone may include grooves or mirror areas.

To achieve the above and/or other aspects of the present invention, there is provided a method of reproducing data from a reproduction-only optical disc having a data zone, a user data area, and a transition zone, the method comprising reproducing disc related information recorded by wobbles from the data zone using a push-pull channel, reproducing disc related information recorded by data pits in the user data area using a sum channel, and reproducing transition-zone information from the transition zone formed between the data zone and the user data area using both the push-pull channel and the sum channel.

To achieve the above and/or other aspects of the present invention, there is provided a method of recording data with respect to a reproduction-only optical disc having a data zone, a user data area, and a transition zone, the method comprising recording disc related information by wobbles in the data zone, recording user data by data pits in the user data area, and recording transition-zone information in the transition zone formed between the data zone and the user data area.

BRIEF DESCRIPTION OF THE DRAWINGS

These and/or other aspects and advantages of the invention will become apparent and more readily appreciated from the following description of the preferred embodiments taken in conjunction with the accompanying drawings in which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
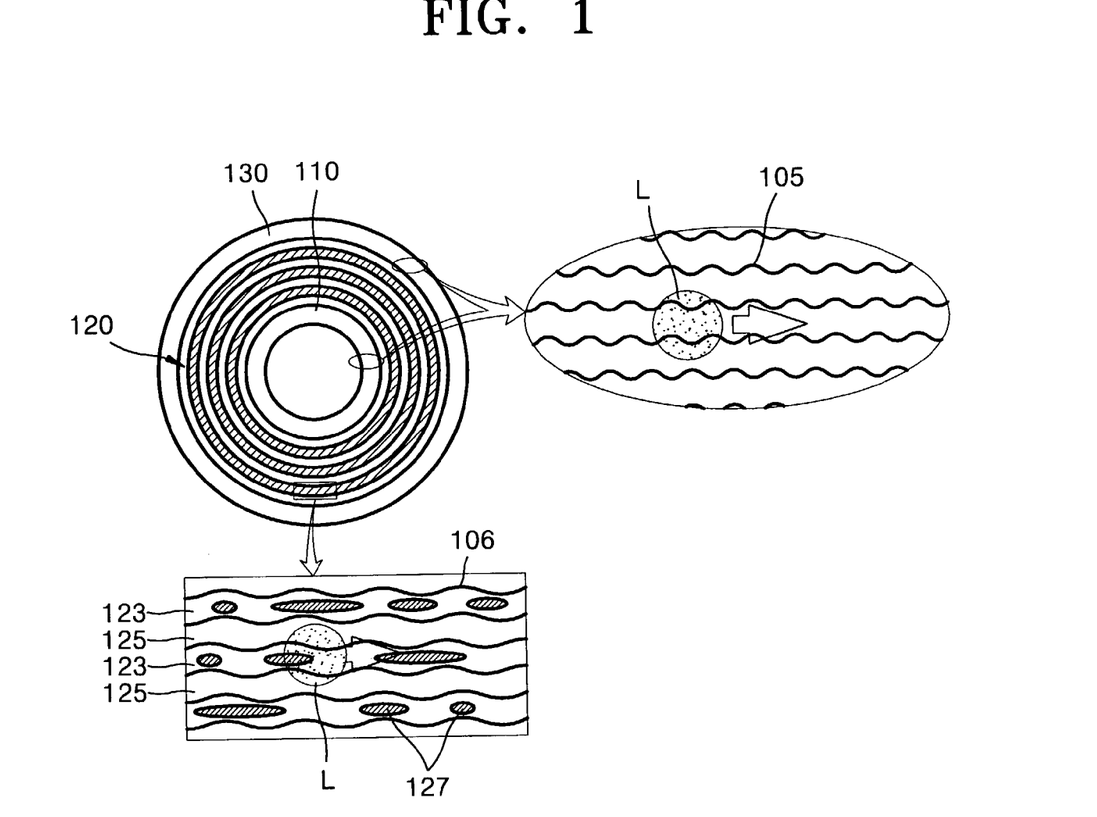
FIG. 1 is a schematic view of a structure of a high-density recordable optical disc which is related to the present invention.

FIG. 1 shows a physical structure of a high-density recordable optical disc related to the present invention. The high-density recordable optical disc includes a lead-in area 110, a user data area 120, and a lead-out area 130. The user data area comprises groove tracks 123 and land tracks 125.

Here, user data can be recorded only on the groove tracks 123, or on both the groove tracks 123 and the land tracks 125.

Where reproduction-only data is recorded, wobble signals 105 and 106 in a form of waves having specific frequencies are successively recorded on both sidewalls of each of the groove tracks 123 and/or the land tracks 125 instead of pits. Here, the reproduction-only data is recorded or reproduced by a laser beam L travelling along the groove tracks 123 and/or the land tracks 125. In particular, the lead-in area 110 and the lead-out area 130 include a reproduction-only area (not shown) to record disc related information and a recordable area, respectively (not shown). The disc related information is recorded by the high frequency wobble signal 105. Further, in recordable areas of the lead-in area 110 and the lead-out area 130 and in the user data area 120, data is recorded by the wobble signal 106 which has a frequency lower than the high frequency wobble signal 105. Reference numeral 127 represents recording marks formed in the user data area 120.

In the high-density recordable optical disc having the above structure, the reproduction-only data recorded in the lead-in area 110 may be reproduced using a push-pull channel, and the user data may be reproduced using a sum channel.

A physical data structure of a high-density reproduction-only optical disc according to the present invention is designed to be consistent with the structure of the high-density recordable optical disc presented above.

Figure 2:
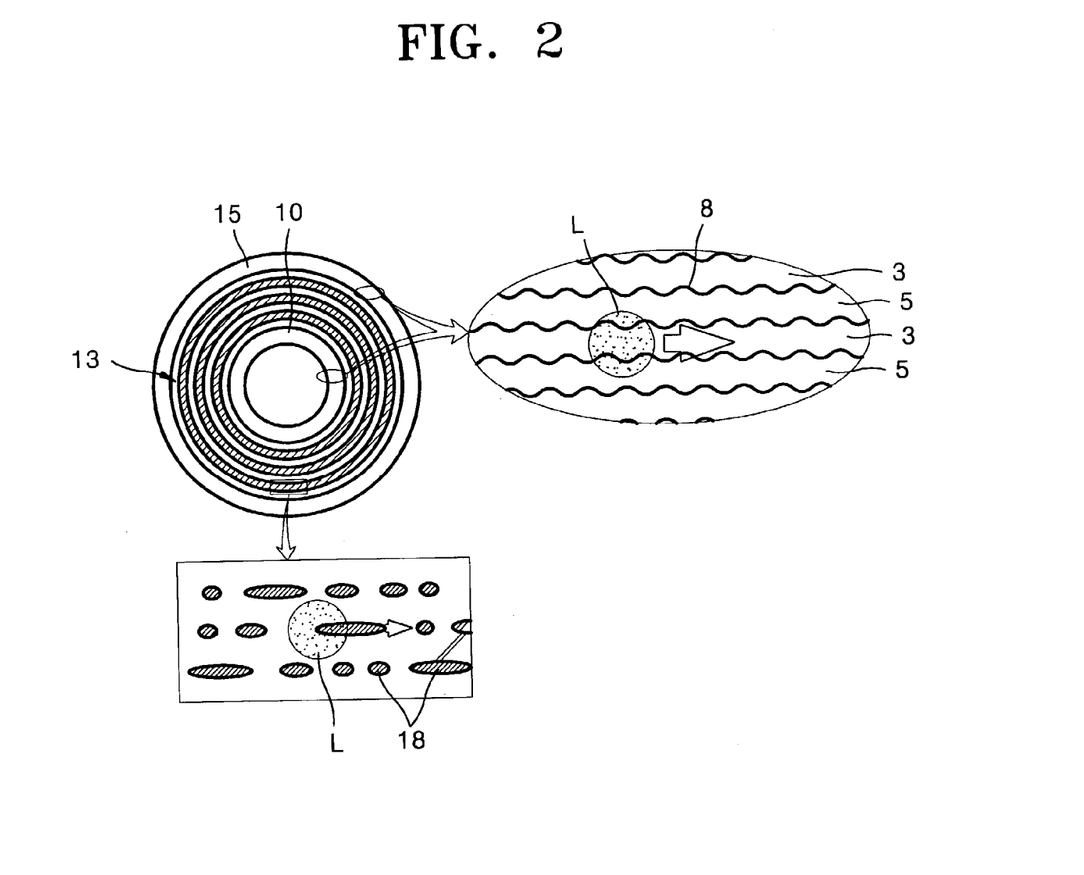
FIG. 2 is a schematic view of a structure of a high-density reproduction-only optical disc according to the present invention.

FIG. 2 shows a high-density reproduction-only optical disc according to an embodiment of the present invention. The disc includes a lead-in area 10, a user data area 13, and a lead-out area 15. Reproduction-only data such as disc related information is recorded in at least one of the lead-in area 10 and the lead-out area 15. Reproduction-only user data is recorded in the user data area 13.

Groove tracks 3 and land tracks 5 are alternatively formed in the lead-in area 10 and the lead-out area 15, and have a high frequency data zone in which the reproduction-only data, such as the disc related information, is recorded by high frequency groove wobbles 8 formed as waves on sidewalls of each of the groove tracks 3 or the land tracks 5, respectively. Further, the reproduction-only user data is recorded by pits 18, for example, when the disc is manufactured. The disc shown in FIG. 2 is a kind of a hybrid disc and has different reproduction channels for the reproduction-only data and the user data. In particular, in the high-density reproduction-only optical disc, the reproduction-only data recorded in the high frequency data zone may be reproduced using a push-pull channel and the user data recorded in the user data area may be reproduced using a sum channel, as in the high-density recordable optical disc shown in FIG. 1. Thus, the present invention provides a high-density reproduction-only optical disc having a data structure that is consistent with a data structure of a high-density recordable optical disc.

In the high-density reproduction-only optical disc including the high frequency data zone in which the groove wobbles 8 are formed and the user data area in which the pits 18 are formed, a transition zone is formed between the high frequency data zone and the user data area. The user data can be stably reproduced from the user data area due to the transition zone.

Figure 3A:
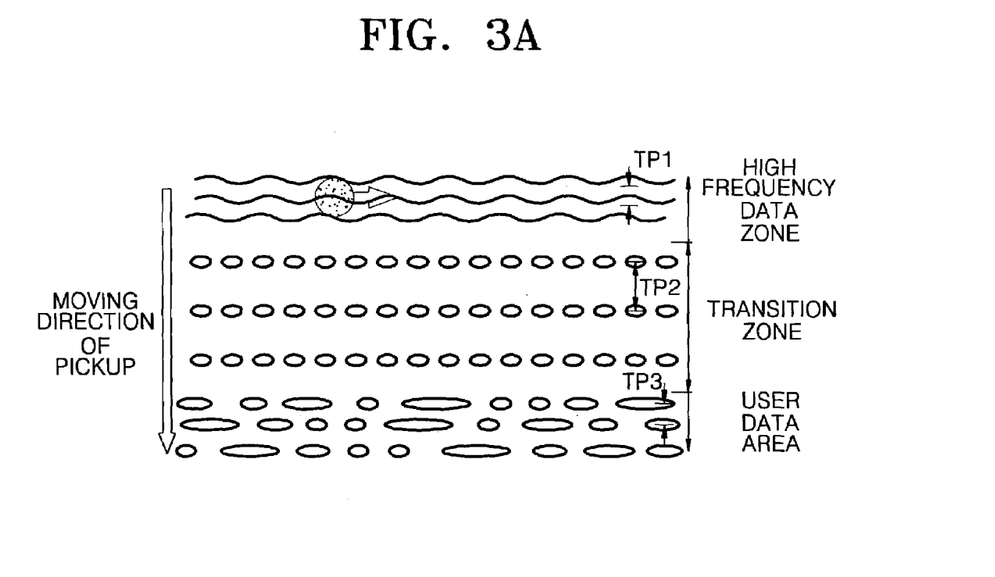
FIGS. 3A through 3C are views illustrating structures of a high-density reproduction-only optical according to embodiments of the present invention.
Figure 3B:
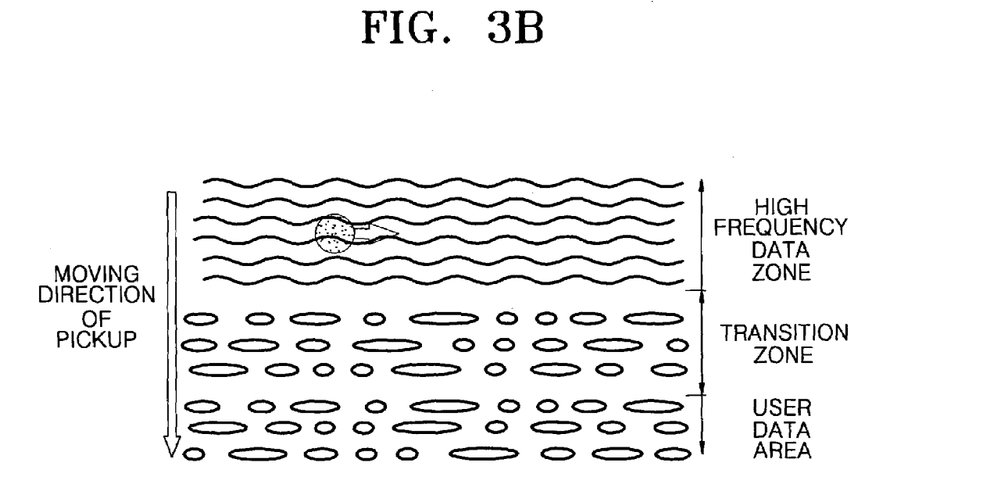

An embodiment of FIG. 3A shows that a transition zone may comprise pit rows. The pit rows may be formed by an arrangement of pits having the same size as shown in FIG. 3A, or by an arrangement of random pits having different sizes as shown in FIG. 3B. In the case where the pit rows are composed of random pits, predetermined information, for example, transition-zone information may be recorded by the pit rows. With reference to FIG. 3A, a track pitch TP2 of the transition zone may be different from a track pitch TP1 of the high frequency data zone or a track pitch TP3 of the user data area.

Figure 3C:
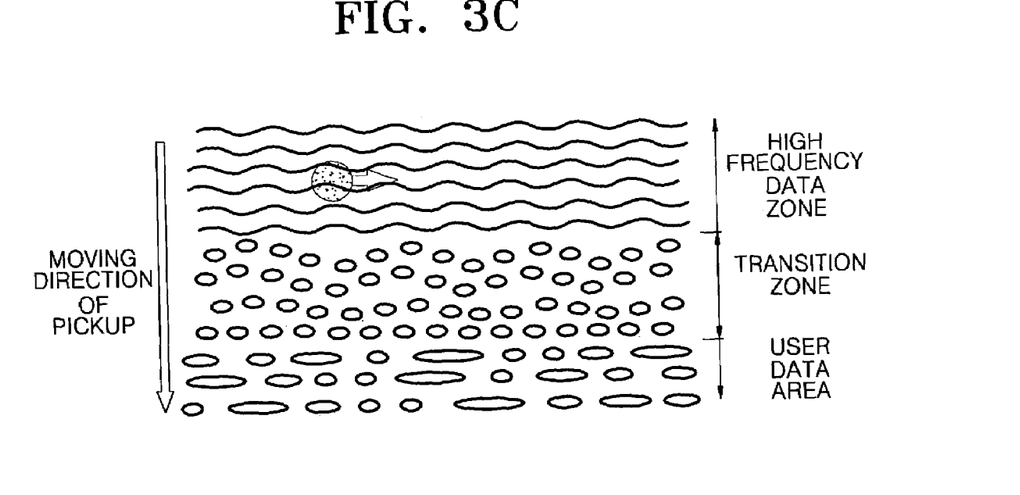

FIG. 3C shows that pit rows formed in a transition zone may be wobbled. Where the transition zone comprises wobbled pit rows, transition-zone information may be recorded according to a form of the wobbled pit rows. In particular, where it is considered that groove wobbles are not formed in a user data area followed by the transition zone, an amplitude of the wobbled pit rows is gradually reduced toward the user data area from the high frequency data zone so that a pit row at an outermost portion of the transition zone is not wobbled, as in the user data area. Thus, data can be reproduced in a more stable manner from the user data area. In other words, since the shape of the pit row at the outermost portion of the transition zone is nearly similar to the user data area, the user data area is stably reproduced without a great change even at a boundary between the transition zone and the user data area. Furthermore, the manufacturing process of the disc is made easier with the above structure.

For example, where the transition zone comprises wobbled pit rows, a data reproduction channel and a tracking method used in a high frequency data zone, a transition zone, and a user data area are as follows.

TABLE 1

| Area | Data Structure | Reproduction Channel | Tracking Method |
| --- | --- | --- | --- |
| High frequency Data Zone | High frequency Groove Wobbles | Push-pull Channel | Push-pull |
| Transition Zone | Wobbled Pits | Push-pull Channel/ Sum Channel | DPD |
| User Data Area | Pits | Sum Channel | DPD |

Where transition zone information is reproduced from wobbled pit rows in the transition zone, signals are detected in both a push-pull channel and a sum channel. Since both the push-pull channel and the sum channel are used in the transition zone, the reliability of data reproduction from the user data area using the sum channel can be improved. That is, data in the transition zone can be reproduced using the same channel as data in the user data area. Since the DPD (Differential Phase Detect) method for embodying a servo tracking and the push-pull method in Table 1 are well-known methods, their descriptions will be omitted.

In a case where the data reproduction channels used in the high frequency data zone, the transition zone, and the user data area are different, as shown in Table 1, the transition zone can be identified by detecting this reproduction channel signals. That is, where signals in an area are detected through both the push-pull channel and the sum channel, the detection area is the transition zone.

Further, a predetermined section along any one of a tangential direction and a radius direction of the disc may be assigned as the transition zone.

A high-density reproduction-only optical disc according to another embodiment of the present invention will be described below. The disc includes a transition zone which is disposed between a high frequency data zone and a user data area.

Figure 4A:
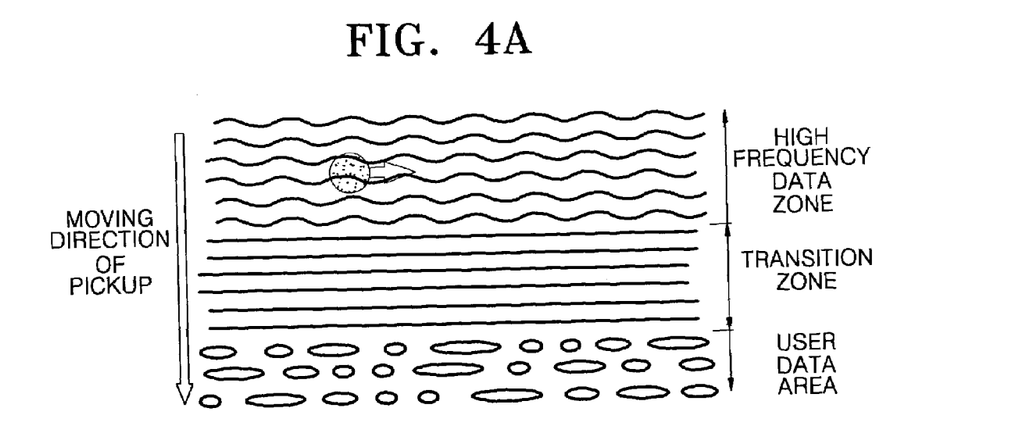
FIGS. 4A through 4C are views illustrating structures of a high-density reproduction-only optical according to other embodiments of the present invention.
Figure 4B:
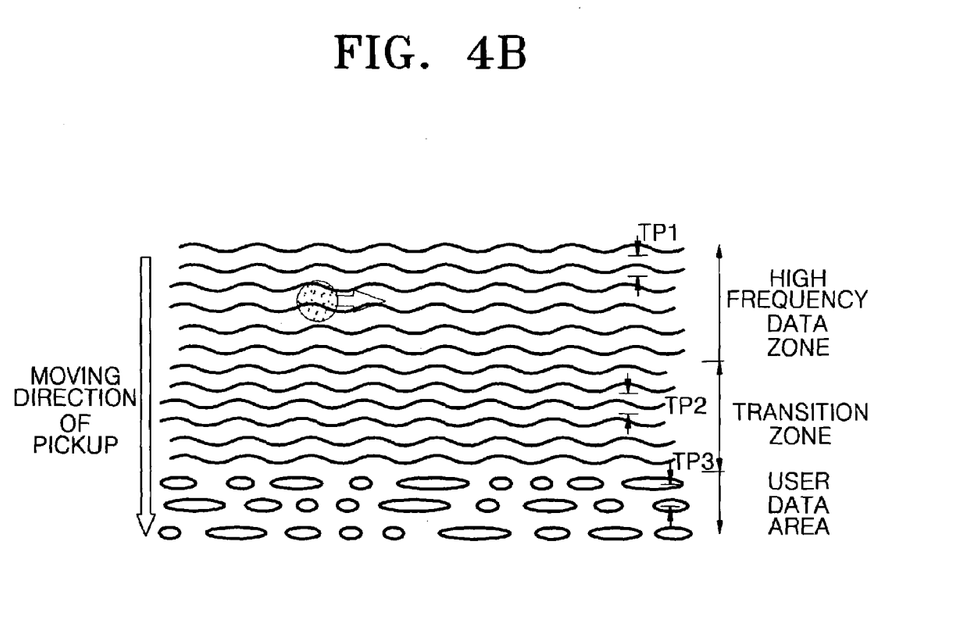

For example, the transition zone may be composed of grooves which are not wobbled as shown in FIG. 4A, or by groove wobbles as shown in FIG. 4B. In the case where the transition zone is composed of the groove wobbles, predetermined information, for example, transition-zone information may be recorded by the groove wobbles in the transition zone. Here, a track pitch TP2 of the transition zone may be different from a track pitch TP1 of a high frequency data zone or a track pitch TP3 of a user data area. The transition zone is distinguished, for example, due to a difference in track pitches.

Figure 4C:
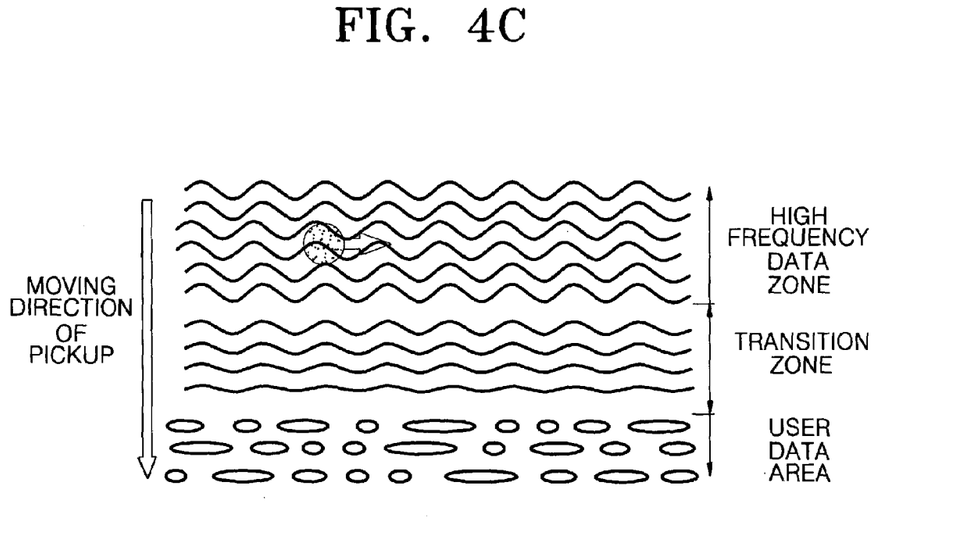

Furthermore, in an embodiment shown in FIG. 4C, the transition zone comprises groove wobbles, and an amplitude of the groove wobbles is gradually reduced toward a user data area from a high frequency data zone. Thus, since the shape of a groove wobble at an outermost portion of the transition zone is nearly similar to the user data area, the user data is reproduced without a great change even at a boundary between the transition zone and the user data area. That is, data can be stably reproduced from the user data area.

Figure 5:
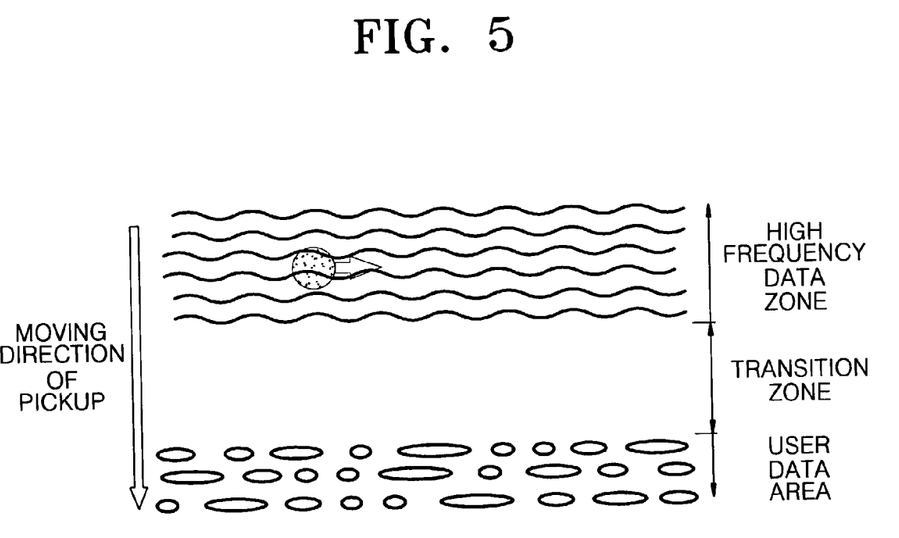
FIG. 5 is a view illustrating a structure of a high-density reproduction-only optical according to yet another embodiment of the present invention.

FIG. 5 shows a high-density reproduction-only optical disc according to yet another embodiment of the present invention. The disc includes a high frequency data zone in which disc related information is recorded by high frequency wobbles, a user data area in which user data is recorded by pits, and a transition zone which is formed between the high frequency data zone and the user data area. In this embodiment, the transition zone comprises mirror areas. Where the transition zone comprises the mirror areas, no reproduction signal is detected in the transition zone.

In a high-density reproduction-only optical disc according to the present invention, only a transition zone in which information is not recorded may be assigned within the disc, or a transition-zone information is recorded in the transition zone.

A method of reproducing data from a high-density reproduction-only optical disc according to the present invention, will now be described.

According to the method, disc related information is reproduced from high frequency groove wobbles in a high frequency data zone through a push-pull channel, and user data is reproduced from pits in a user data area through a sum channel. Further, transition zone information is reproduced from a transition zone provided between the high frequency data zone and the user data area using both the push-pull channel and the sum channel. Thus, where signals are detected through both the push-pull channel and the sum channel, it can be seen that an area in which the signals are detected is the transition zone. Here, the transition zone comprises pit rows, and the pit rows are wobbled. Since reproduction of the user data from the pits uses the sum channel and reproduction of the disc related information from the high frequency groove wobbles uses the push-pull channel, reproduction of the transition-zone information from the wobbled pit rows uses the sum channel and the push-pull channel.

As described above, since a high-density reproduction-only optical disc includes a transition zone between a high frequency data zone in which disc related information is recorded by high frequency wobbles and a user data area in which user data is recorded by pits, the reliability of reproducing data from the user data area is improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A high-density reproduction-only optical disc comprising:
   a high frequency data zone in which disc related information is recorded by high frequency wobbles;
   a user data area in which user data is recorded by unwobbled data pits; and
   a transition zone which is formed between the high frequency data zone and the user data area.

2. The high-density reproduction-only optical disc of claim 1, wherein the transition zone includes pits.

3. The high-density reproduction-only optical disc of claim 2, wherein the pits in the transition zone have the same size and are arranged in one or more rows.

4. The high-density reproduction-only optical disc of claim 2, wherein the pits in the transition zone have different sizes and are arranged in one or more rows.

5. The high-density reproduction-only optical disc of claim 2, wherein:
   the pits are arranged in rows, and
   one or more rows of pits are wobbled.

6. The high-density reproduction-only optical disc of claim 5, wherein an amplitude of the wobbled rows of pits is gradually reduced toward the user data area from the high frequency data zone.

7. The high-density reproduction-only optical disc of claim 6, wherein a row of pits of the transition zone at an outermost portion thereof is not wobbled.

8. The high-density reproduction-only optical disc of claim 5, wherein transition-zone information is recorded by the one or more wobbled pits in the transition zone.

9. The high-density reproduction-only optical disc of claim 2, wherein predetermined information is recorded by the pits in the transition zone.

10. The high-density reproduction-only optical disc of claim 2, wherein:
    the pits are arranged in rows, and
    the transition zone has a track pitch that is different from that of the high frequency data zone or from that of the user data area.

11. The high-density reproduction-only optical disc of claim 1, wherein the transition zone includes grooves.

12. The high-density reproduction-only optical disc of claim 11, wherein the grooves are wobbled.

13. The high-density reproduction-only optical disc of claim 12, wherein an amplitude of the wobbled grooves is gradually reduced toward the user data area from the high frequency data zone.

14. The high-density reproduction-only optical disc of claim 11, wherein:
    the grooves are arranged in rows, and
    the transition zone has a track pitch that is different from that of the data zone or from that of the user data area.

15. The high-density reproduction-only optical disc of claim 1, wherein the transition zone comprises mirror areas.

16. The high-density reproduction-only optical disc of claim 1, wherein the transition zone includes predetermined information.

17. The high-density reproduction-only optical disc of claim 16, wherein the predetermined information includes transition zone information.

18. The high-density reproduction-only optical disc of claim 1, wherein the transition zone has a track pitch that is different from that of the high frequency data zone or from that of the user data area.

19. A method of reproducing data from a reproduction-only optical disc having a data zone, a user data area, and a transition zone, the method comprising:
- reproducing disc related information recorded by wobbles in the data zone using a push-pull channel;
- reproducing user data recorded by data pits in the user data area using a sum channel; and
- reproducing transition-zone information from the transition zone formed between the data zone and the user data area, using both the push-pull channel and the sum channel.

20. The method of claim 19, wherein the transition zone includes pits arranged in rows.

21. The method of claim 20, wherein the pits in the transition zone have different sizes.

22. The method of claim 20, wherein one or more rows of pits are wobbled.

23. The method of claim 22, wherein an amplitude of the wobbled rows of pits is gradually reduced toward the user data area from the data zone.

24. The method of claim 19, wherein reproducing of the disc related information comprises reproducing the disc related information recorded by high frequency wobbles.

25. A reproduction-only medium comprising:
- a data zone in which disc related information is recorded by wobbles;
- a user data area in which user data is recorded by unwobbled data pits; and
- a transition zone which is formed between the data zone and the user data area.

26. The reproduction-only medium of claim 25, wherein the reproduction-only medium is a high-density reproduction-only optical disc.

27. The reproduction-only medium of claim 25, wherein the transition zone includes one or more rows of pits.

28. The reproduction-only medium of claim 25, wherein the transition zone includes one of grooves and mirror areas.

29. A method of initially recording data with respect to a reproduction-only optical disc having a data zone, a user data area, and a transition zone, the method comprising:
- recording disc related information by wobbles in the data zone;
- recording user data by unwobbled data pits in the user data area; and
- recording transition-zone information in the transition zone formed between the data zone and the user data area.

30. The method of claim 29, wherein the recording of the transition-zone information includes recording pits arranged in predetermined number of rows.

31. The method of claim 30, wherein the recording of the pits includes wobbling one or more rows of pits.

32. The method of claim 31, wherein the wobbling of the one or more rows of pits comprises wobbling the one or more rows of pits so as to gradually reduce an amplitude of the wobbled rows of pits toward the user data area from the high frequency data zone.

33. The method of claim 30, wherein the recording of the pits comprises one of recording the pits having the same size and recording the pits having different sizes.

34. The method of claim 29, wherein the recording of the transition-zone information includes providing grooves in the transition zone.

35. The method of claim 34, wherein the providing of the grooves includes wobbling the grooves.

36. The method of claim 35, wherein the wobbling of the grooves comprises wobbling the grooves so as to gradually reduce an amplitude of the wobbled grooves toward the user data area from the high frequency data zone.

37. The method of claim 29, wherein the recording of the disc related information comprises recording the disc related information by high frequency wobbles in the data zone.

* * * * *

UNITED STATES PATENT AND TRADEMARK OFFICE
CERTIFICATE OF CORRECTION

PATENT NO. : 7,218,601 B2  Page 1 of 1
APPLICATION NO. : 10/461426
DATED : May 15, 2007
INVENTOR(S) : Kyung-geun Lee et al.

It is certified that error appears in the above-identified patent and that said Letters Patent is hereby corrected as shown below:

Title Page, Item (73)
Assignee, change
"Samsung Electronic" to --Samsung Electronics--

Signed and Sealed this

Fourteenth Day of August, 2007

JON W. DUDAS
*Director of the United States Patent and Trademark Office*